US012772168B2

(12) United States Patent
Li et al.

(10) Patent No.: US 12,772,168 B2
(45) Date of Patent: Oct. 20, 2026

(54) POWER SAVING DURING CHANNEL OCCUPANCY TIME (COT) OF AN UNLICENSED BAND

(71) Applicant: VIVO MOBILE COMMUNICATION CO., LTD., Dongguan (CN)

(72) Inventors: Na Li, Dongguan (CN); Xueming Pan, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 444 days.

(21) Appl. No.: 18/162,388

(22) Filed: Jan. 31, 2023

(65) Prior Publication Data

US 2023/0239790 A1 Jul. 27, 2023
US 2024/0073818 A9 Feb. 29, 2024

Related U.S. Application Data

(63) Continuation of application No. PCT/CN2021/110931, filed on Aug. 5, 2021.

(30) Foreign Application Priority Data

Aug. 6, 2020 (CN) ......................... 202010785082.0

(51) Int. Cl.

| | |
|---|---|
| ***H04W 52/02*** | (2009.01) |
| ***H04W 74/0808*** | (2024.01) |
| *H04B 7/06* | (2006.01) |

(52) U.S. Cl.

CPC ... *H04W 52/0225* (2013.01); *H04W 74/0808* (2013.01); *H04B 7/0626* (2013.01)

(58) Field of Classification Search

CPC ......... H04W 52/0225; H04W 74/0808; H04W 16/14; H04W 52/0203; H04W 52/0212; H04W 52/0216; H04W 52/0219; H04W 52/0229; H04W 52/0235; H04W 52/0248; H04W 52/0258; H04W 74/006;

(Continued)

(56) References Cited

U.S. PATENT DOCUMENTS

2015/0146642 A1* 5/2015 Seo ........................... H04L 1/06 370/329
2016/0135176 A1* 5/2016 Wong ...................... H04W 4/70 370/329
2017/0215179 A1* 7/2017 Choi ..................... H04W 16/14

(Continued)

FOREIGN PATENT DOCUMENTS

CN 105578573 A 5/2016
CN 107306442 A 10/2017

(Continued)

OTHER PUBLICATIONS

Extended European Search Report regarding European Patent Application No. 21854371.8, dated Dec. 18, 2023.

(Continued)

*Primary Examiner* — Ian N Moore
*Assistant Examiner* — Latresa A McCallum
(74) *Attorney, Agent, or Firm* — Harness, Dickey & Pierce, P.L.C.

(57) ABSTRACT

An indication method of a power saving mode includes: instructing, by a network side device in a channel occupancy time (COT) of an unlicensed band, a terminal to enter a power saving mode.

20 Claims, 5 Drawing Sheets

(58) Field of Classification Search
CPC . H04B 7/0626; H04L 27/0006; H04L 5/0044; H04L 5/0053; H04L 5/0094; Y02D 30/70
See application file for complete search history.

(56) References Cited

U.S. PATENT DOCUMENTS

| | | | | |
|---|---|---|---|---|
| 2021/0219341 | A1 | 7/2021 | Jia et al. | |
| 2021/0250925 | A1* | 8/2021 | Zhang | H04W 72/23 |
| 2022/0070918 | A1* | 3/2022 | Fan | H04W 16/14 |
| 2022/0312313 | A1* | 9/2022 | Ma | H04W 76/28 |
| 2022/0377795 | A1* | 11/2022 | Bhattad | H04W 74/0816 |
| 2025/0024372 | A1* | 1/2025 | Ma | H04W 52/0216 |

FOREIGN PATENT DOCUMENTS

| | | | | | |
|---|---|---|---|---|---|
| CN | 107889114 | A | | 4/2018 | |
| CN | 110972275 | A | | 4/2020 | |
| EP | 3300430 | A1 | * | 3/2018 | H04W 24/02 |
| WO | WO-2015039677 | A1 | * | 3/2015 | H04W 52/0277 |
| WO | WO-2019160660 | A1 | * | 8/2019 | H04B 7/0626 |
| WO | WO-2020032618 | A1 | * | 2/2020 | H04L 5/0048 |
| WO | WO-2020165200 | A1 | | 8/2020 | |
| WO | WO-2020222509 | A1 | * | 11/2020 | H04W 52/0216 |

OTHER PUBLICATIONS

Second Office Action regarding Chinese Patent Application No. 202010785082.0, dated Jan. 24, 2024. Translation provided by Bohui Intellectual Property.

“Discussion on Rel-16 NRU UE features,” vivo, 3GPP TSG RAN WG1 #100bis, R1-2001720, dated Apr. 30, 2020.

“Feature lead summary for NR-U DL Signals and Channels,” Motorola Mobility, Lenovo, 3GPP TSG RAN WG1#97, R1-1907705, dated May 17, 2019.

“Summary on Email discussion [100b-e-NR-UEFeatures-NRU-05],” NTT Docomo, Inc., 3GPP TSG RAN WG1 #100bis-e, R1-2002866, dated Apr. 30, 2020.

International Search Report and Written Opinion of the International Searching Authority regarding International Patent Application No. PCT/CN2021/110931, dated Nov. 3, 2021. Translation provided by Bohui Intellectual Property.

“Discussion on DL signals and channels in NR unlicensed,” Google, 3GPP TSG RAN WG1 #98b, R1-1911331, dated Oct. 20, 2019.

“Considerations on frame structure for NR unlicensed operations,” Sony, 3GPP TSG RAN WG1 Meeting #94bis, R1-1810631, dated Oct. 12, 2018.

“Other aspects on bandwidth Parts,” NTT Docomo, Inc., 3GPP TSG RAN WG1 Meeting #92bis, R1-1805058, dated Apr. 20, 2018.

* cited by examiner

POWER SAVING DURING CHANNEL OCCUPANCY TIME (COT) OF AN UNLICENSED BAND

CROSS-REFERENCE TO RELATED APPLICATIONS

This application is a Bypass Continuation Application of PCT/CN2021/110931 filed on Aug. 5, 2021, which claims priority to Chinese Patent Application No. 202010785082.0 filed on Aug. 6, 2020, which are incorporated herein by reference in their entirety.

TECHNICAL FIELD

This application pertains to the field of wireless communication technologies, and in particular, to an indication method and apparatus of a power saving mode, a terminal, and a network side device.

BACKGROUND

Before sending information on an unlicensed band, the terminal or network device needs to perform clear channel assess (CCA) or extended clear channel assess (eCCA) to listen the channel. That is, to perform energy detection (ED). When energy is less than a specified threshold, the channel is determined as an idle channel, so that transmission can be started, namely, listen before talk (LBT). A process of determining whether the channel is idle through the CCA and of transmission may be referred to as a channel access process.

Because the unlicensed band is shared by a plurality of technologies or transmission nodes, such competition-based access mode leads to the uncertainty of channel available time. When the channel is available, the transmissible position of signal transmission on the network side may have been missed and the signal cannot be transmitted. As a result, the receiving end might be unable to receive the signal configured on the network side normally, or perform terminal behaviors such as physical downlink control channel (PDCCH) monitoring, wireless environment monitoring and measurement and the like based on the configuration of the network side after receiving the signal.

Frame based equipment (FBE) means that sending/receiving timing of the equipment adopts a periodic structure, and a period therefor is a fixed frame period (FFP). An FBE node uses an LBT-based channel access mechanism to occupy a channel. A node that initiates a transmission sequence that includes one or more consecutive transmissions is referred to as an initiating device, and another node is referred to as a responding device. The FBE node may be an initiating device, a responding device, or support functions of both the two nodes.

SUMMARY

According to a first aspect, an indication method of a power saving mode is provided, including: instructing, by a network side device in a channel occupancy time (COT) of an unlicensed band, a terminal to enter a power saving mode.

According to a second aspect, an indication apparatus of a power saving mode is provided, including: an indication module, configured to instruct, in a channel occupancy time (COT) of an unlicensed band, a terminal to enter a power saving mode.

According to a third aspect, a method for determining whether to enter a power saving mode is provided, including: determining, by a terminal based on an indication of a network side device within a COT of an unlicensed band, whether to enter a power saving mode.

According to a fourth aspect, an apparatus for determining whether to enter a power saving mode is provided, including: an execution module, configured to determine, based on an indication of a network side device within a COT of an unlicensed band, whether to enter a power saving mode.

According to a fifth aspect, a terminal is provided, where the terminal includes a processor, a memory, and a program or an instruction stored in the memory and executable on the processor, and when the program or the instruction is executed by the processor, steps of the method according to the third aspect are implemented.

According to a sixth aspect, a network side device is provided, where the network side device includes a processor, a memory, and a program or an instruction stored in the memory and executable on the processor, and when the program or the instruction is executed by the processor, steps of the method according to the first aspect are implemented.

According to a seventh aspect, a non-transitory computer-readable storage medium is provided. The non-transitory computer-readable storage medium stores a program or an instruction, and when the program or the instruction is executed by a processor, steps of the method according to the first aspect or the third aspect are implemented.

According to an eighth aspect, a chip is provided. The chip includes a processor and a communications interface, the communications interface is coupled to the processor, and the processor is configured to execute a program or an instruction of a network side device, to implement the method according to the first aspect, or the processor is configured to execute a program or an instruction of a terminal, to implement the method according to the third aspect.

According to a ninth aspect, a computer program product is provided. The computer program product includes a processor, a memory, and a program or an instruction stored in the memory and executable on the processor, where when the program or the instruction is executed by the processor, steps of the method according to the first aspect or the third aspect are implemented.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that, data used in this way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and the character "/" generally represents an "or" relationship between associated objects.

It should be noted that the technology described in the embodiments of this application is not limited to a Long Term Evolution (LTE)/LTE-Advanced (LTE-A) system, and may also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The described technologies can be applied to both the systems and the radio technologies mentioned above as well as to other systems and radio technologies. However, in the following descriptions, a new radio (NR) system is described for an illustration purpose, and NR terms are used in most of the following descriptions, although these technologies may also be applied to other applications than an NR system application, such as a 6-th generation (6G) communications system.

Figure 1:
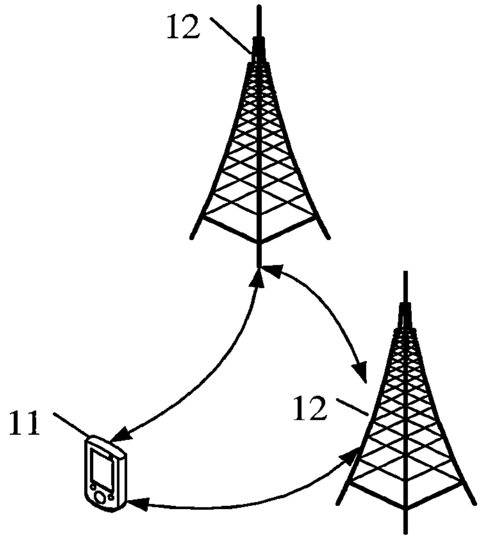
FIG. 1 is a block diagram of a wireless communications system to which embodiments of this application can be applied.

FIG. 1 is a block diagram of a wireless communications system to which embodiments of this application can be applied. The wireless communications system includes a terminal 11 and a network side device 12. The terminal 11 may also be referred to as a terminal device or user equipment (UE). The terminal 11 may be a terminal side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device, vehicle user equipment (VUE), or pedestrian user equipment (PUE). The wearable device includes a bracelet, a headset, glasses, and the like. It should be noted that a type of the terminal 11 is not limited in the embodiments of this application. The network side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a WiFi node, a transmitting receiving point (TRP), or another appropriate term in the art. As long as the same technical effect is achieved, the base station is not limited to a specific technical term. It should be noted that the base station in the NR system is taken only as an example in the embodiments of this application, but a type of the base station is not limited.

With reference to the accompanying drawings, the indication method of a power saving mode provided in the embodiments of this application is described by using embodiments and application scenarios.

Before starting transmission at a start moment of a specific fixed frame period, the initiating device performs clear channel assess (CCA). If it is determined that the fixed frame period is idle, the fixed frame period may be sent immediately. Otherwise, sending is not allowed in a following fixed frame period (except short control signaling transmissions specified in supervision requirements). In a fixed frame period in which sending has started, total duration in which a corresponding initiating device can perform transmission without re-estimating availability of a channel is defined as channel occupancy time (COT). The initiating device may perform transmission for a plurality of times on a specified channel within the COT without performing additional CCA, provided that a time interval between adjacent transmissions in these transmissions does not exceed 16 μs. If a time interval between adjacent transmissions within the COT exceeds 16 μs, before continuing transmission, the initiating device needs to perform additional CCA, and continue transmission only when determining, through CCA, that the channel is idle. Time intervals between all adjacent transmissions are included in the COT. In addition, the initiating device may authorize use rights of a specified channel in a specific period of time within the COT to one to more associated responding devices for transmission.

Usually, gNB downlink signaling informs UE of FFP configuration information. gNB and UE may use a same FFP configuration. The gNB performs LBT before FFP, and sends a downlink signal if listens that the channel is idle. If the UE detects a downlink signal, the UE may share COT of the gNB.

However, there is no technical solution of how the terminal reduces power consumption in the unlicensed band, so that it is impossible to reduce the power consumption when the terminal operates on the unlicensed band.

Figure 2:
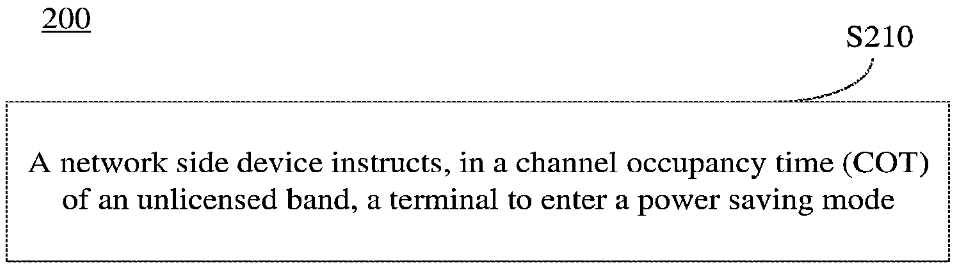
FIG. 2 is a schematic flowchart of an indication method of a power saving mode according to an embodiment of this application.

FIG. 2 is a schematic flowchart of an indication method of a power saving mode according to an embodiment of this application. The method 200 may be performed by a network side device. In other words, the method may be performed by software or hardware installed in the network side device. As shown in FIG. 2, the method may include the following steps.

S210. A network side device instructs, in a COT of an unlicensed band, a terminal to enter a power saving mode.

In this embodiment of this application, the network side device instructs, within the channel occupancy time (COT) of the unlicensed band, the terminal to enter the power saving mode, and the terminal enters the power saving mode based on the indication of the network side device, so as to reduce the power consumption of the terminal.

In a possible implementation, the network side device may configure a parameter related to the power saving mode for the terminal, and the terminal may enter the power saving mode based on the parameter related to the power saving mode configured by the network side device.

In the foregoing possible implementation, optionally, the parameter related to the power saving mode may include at least one of the following (1) to (3).

(1) First indication information. The first indication information indicates a first time-frequency range of monitoring a PDCCH by the terminal in the power saving mode. The first indication information indicates a time range and/or a frequency range of monitoring a PDCCH by the terminal in the power saving mode.

That is, the network side device configures the terminal to monitor the PDCCH within a specified time range and/or a specified frequency domain range in the power saving mode.

The specified time range may be configured by a higher layer or indicated by dynamic signaling. The specified time range may be from a moment when the UE enables the power saving mode until a next FFP when the initiating device performs CCA.

In addition, the specified frequency domain range may also be configured by a higher layer or indicated by dynamic signaling. A granularity of the frequency domain range may be one or more carriers, or one and/or more LBT subbands on a single carrier.

The monitored PDCCH may be configured by a higher layer or indicated by dynamic signaling or predefined. For example, the PDCCH includes at least a UE-specific search space (USS) set and/or a Type 3 common search space (CSS) set. Alternatively, the higher layer may configure a plurality of search space sets 1, 2, . . . , M, and the physical layer dynamically indicates which search space set needs to be monitored in the power saving mode. It should be noted that a PDCCH that is monitored may be configured, and then the terminal may determine to monitor the PDCCH within the first time-frequency range based on the configuration, or a PDCCH that is not monitored may also be configured, and then the terminal may determine to monitor a PDCCH other than the PDCCH within the first time-frequency range based on the configuration. Configuring the PDCCH that is monitored or the PDCCH that is not monitored is not limited in this embodiment of this application.

(2) Second indication information. The second indication information indicates whether the terminal performs channel state measurement in the power saving mode and/or a type of channel state measurement performed in the power saving mode. That is, the second indication information indicates whether and what channel state measurement is performed by the UE in the power saving mode.

For example, the network side device may configure and/or specify the second indication information through the protocol to indicate at least one of:

(2-1) not performing any channel state information (CSI) measurement;

(2-2) only performing periodic CSI measurement, and not performing or not supporting aperiodic and/or semi-persistent CSI measurement;

(2-3) performing restricted CSI measurement, for example, only measuring an interference confidence of a channel and/or a channel quality indicator (CQI) of a broadband;

(2-4) performing all CSI measurements;

(2-5) not performing radio resource management (RRM) measurement;

(2-6) performing RRM measurement; or (2-7) performing relaxed RRM measurement.

(3) Third indication information. The third indication information indicates whether the terminal performs uplink transmission in the power saving mode and/or a type of uplink transmission performed in the power saving mode. That is, the third indication information indicates whether the UE performs uplink transmission in the power saving mode and what uplink transmission is performed.

For example, in the power saving mode, the network side device may configure or specify through the protocol at least one of:

(3-1) not performing any uplink transmission;

(3-2) performing scheduling request (SR) transmission of a physical uplink control channel (PUCCH) and/or periodic channel state information (P-CSI) transmission;

(3-3) performing uplink configured grant data (configured grant PUSCH) transmission;

(3-4) performing semi-persistent CSI (SP-CSI) transmission; or (3-5) performing periodic or semi-persistent periodic sounding reference signal (SRS) transmission.

In a possible implementation, the instructing, by a network side device in a channel occupancy time (COT) of an unlicensed band, a terminal to enter a power saving mode may include: sending, by the network side device, indication information to the terminal within the COT, and instructing the terminal to enter the power saving mode by using the indication information.

The indication information may be indication signaling sent by the network side device to the terminal, or energy saving response information of the network side device in response to an energy saving request initiated by the terminal.

In this embodiment of this application, the network side device may instruct the terminal to enter the power saving mode after the network side device actively initiates channel access, or the device may instruct the terminal to enter the power saving mode after the terminal actively initiates channel access. The indication method of a power saving mode provided in this embodiment of this application is described below in accordance with these two cases.

1. The network side device actively initiates channel access (that is, the network side device starts the COT).

In a possible implementation, the network side device initiates channel access of the unlicensed band, so as to obtain the COT of the unlicensed band; and the network side device shares the obtained COT with the terminal. In this possible implementation, after finishing channel access (LBT), the network side device may share the channel occupation time (COT) with UE with uplink data and/or signal transmission requirements.

In a possible implementation, after sharing the COT with the terminal, the network side device may send indication signaling to the terminal within the COT to instruct the UE to enter the power saving mode.

For example, before transmission is started at the start time of a specific FFP, the network side device acts as the initiating device and performs channel idle estimation. If the channel is determined to be idle, the network side device may transmit data to the terminal, and the network side device may perform transmission for a plurality of times on a designated channel within the COT without performing additional CCA. As for the terminal, if the downlink data has been transmitted or there is no data transmission (including uplink data and downlink data) requirement in the FFP, the network side device may send the indication signaling to the terminal within the COT.

A length of the COT may be preset or specified by the protocol. For example, the COT cannot be longer than 95% of the FFB, and the COT may be closely followed by an idle period which lasts until the beginning of a next FFB. Therefore, the length of the idle period is at least 5% of the FFB. In addition, in order to avoid the idle period being too short, a minimum value may be specified, for example, the minimum value is 100 μs.

In the foregoing possible implementation, the indication signaling may include a downlink signal, where the downlink signal includes but is not limited to at least one of:

(1) a downlink signal carried on a UE-specific PDCCH;
(2) a downlink signal carried on a group common PDCCH;
(3) a specific reference signal; or
(4) a specific reference sequence.

In a possible implementation, the downlink signal may indicate at least one of:

(1) time information of sharing the COT and/or time information of the power saving mode, where the time information includes but is not limited to a start location, an end location, and/or duration. For example, if the downlink signal indicates the duration of the COT, the UE will no longer monitor the PDCCH after an end moment of the COT and before an end moment of the FFP;
(2) frequency domain information of sharing the COT and/or frequency domain information of the power saving mode, where the frequency domain information includes but is not limited to a shared continuous or discontinuous resource block (RB) and/or an RB set and/or a carrier. For example, if the downlink signal indicates the frequency domain information of the COT, the UE may not monitor, after an end moment of the COT and before an end moment of the FFP, the PDCCH on a frequency domain indicated by the downlink signal; or
(3) a monitored or unmonitored search space candidate set. For example, if the downlink signal indicates which search space candidate set to monitor or not to monitor, the UE may not monitor or start monitoring the indicated search space candidate set after the end moment of the COT and before the end moment of the FFP.

For another example, if the downlink signal indicates time information, frequency domain information, and/or search space candidate set of the power saving mode (namely, the parameter related to the power saving mode), the UE enables the power saving mode behavior within the time and frequency range indicated by the downlink signal.

Alternatively, in another possible implementation, the indication information may also be energy saving response information sent by the network side device to the UE after receiving the energy saving request initiated by the terminal within the COT.

For example, UE determines, based on a battery and/or service state of the UE, that the UE needs to enter the power saving mode, and the UE may initiate an energy saving request to the network side device; and the network side device decides whether to respond to the UE based on the energy saving request. For example, if the network side device determines that downlink transmission of the UE is finished, it is determined that the UE may be responded to.

Optionally, the energy saving request may be used to indicate a power saving parameter, where the power saving parameter may include the first indication information, the second indication information, and the third indication information, but values indicated by the first indication information, the second indication information, and the third indication information in the power saving parameter may be different from or the same as values of the first indication information, the second indication information, and the third indication information configured by the network side device. Details are not limited in this embodiment of this application.

In a possible implementation, signaling of the energy saving request includes but is not limited to at least one of:

(1) uplink control signaling;
(2) a specific scheduling request (SR);
(3) an uplink signal carried on a physical uplink shared channel (PUSCH);
(4) a medium access control (MAC) control element (CE); or
(5) a specific uplink reference signal, for example, a demodulation reference signal (DMRS) or a sounding reference signal (SRS).

For example, different sequence values of SR, DMRS, SRS and/or transmitted resources in a time-frequency domain may be corresponding to different power saving modes and/or power saving degrees (namely, the power saving parameter). For example, time ranges and/or frequency ranges of power saving and/or configurations of monitored PDCCH space sets may be different. Based on sequence values of SR, DMRS, SRS and/or transmitted resources in a time-frequency domain, the network side device may learn the power saving mode and/or the power saving degree requested by the UE.

For example, if the signaling of the energy saving request is the PUSCH and/or the MAC CE and/or the uplink control information (UCI), the signaling of the energy saving request may indicate any one of:

(1) time information of sharing the COT and/or time information of the power saving mode, for example, a start location, an end location, and/or duration;
(2) frequency domain information of sharing the COT and/or frequency domain information of the power saving mode, for example, a shared continuous or discontinuous RB (s) and/or an RB set (s) and/or a carrier (s); or
(3) a search space candidate set that is expected to be monitored or not.

For example, if the signaling of the energy saving request indicates the duration of the COT, the UE will no longer monitor the PDCCH after an end moment of the COT and before an end moment of the FFP in the indicated power saving mode and/or the power saving degree.

For example, if the signaling of the energy saving request indicates the frequency domain information of the COT, the UE may not monitor, after an end moment of the COT and before an end moment of the FFP, the PDCCH on the indicated frequency domain in the indicated power saving mode and/or the power saving degree.

For example, if the signaling of the energy saving request indicates which search space candidate set to monitor or not to monitor, the UE may not monitor or start monitoring the indicated search space candidate set after the end moment of the COT and before the end moment of the FFP in the indicated power saving mode and/or the power saving degree.

For another example, if the signaling of the energy saving request indicates time information, frequency domain information, and/or search space candidate set of the power saving mode, the UE enables the power saving mode within the indicated time and frequency range in the indicated power saving mode and/or the power saving degree. 2. The terminal actively initiates channel access (that is, the terminal starts the COT).

In a possible implementation, the terminal may initiate channel access (LBT) of the unlicensed band when data needs to be transmitted, and after the channel access is successful, the obtained COT is shared with the network side device for use. That is, in this possible implementation, the network side device obtains the COT shared by the terminal, and the COT is obtained after the terminal initiates channel access of the unlicensed band based on the channel access parameter.

In the foregoing possible implementation, optionally, if the UE successfully accesses channels on a plurality of carriers or a plurality of LBT subbands simultaneously, the UE may send uplink control information to the network side device (for example, the gNB), to indicate a quantity of or the number of carriers that can be shared with the network side device or a quantity of or the number of LBT subbands that can be shared with the network side device. The network side device may obtain the carrier or the LBT subband used within the COT based on the uplink control information.

In a possible implementation, the channel access parameter may be configured by the network side device for the terminal. Therefore, before the obtaining the COT shared with the terminal, the method may further include: configuring the channel access parameter for the terminal.

In a possible implementation, the channel access parameter may include at least one of: CCA duration; a contention window length; or a channel occupancy length. For example, when the UE performs channel access in a load based equipment (LBE) manner, the channel access parameter that may need to be configured by the network side device includes: (1) CCA duration or a contention window length; (2) a channel occupancy length.

Alternatively, in another possible implementation, when the UE performs channel access in a frame based equipment (FBE) manner, the channel access parameter includes at least one of:

(1) a start location of an FFP;
(2) an offset of an FFP;
(3) a period length of an FFP;
(4) CCA duration;
(5) a channel occupancy length; or
(6) an idle period length.

In a possible implementation, after the network side device obtains the COT sharing with the UE, the network side device may send indication signaling to the terminal to instruct the UE to enter the power saving mode. For example, if downlink data transmission of the UE is finished or there is no data to be transmitted in the FFP, the network side device may send indication signaling to the terminal, and after receiving the indication signaling, the terminal enters the power saving mode and executes the behavior in the power saving mode. The indication signaling sent by the network side device to the terminal is the same as the indication signaling sent by the network side device to the terminal in the channel access actively initiated by the network side device in 1. Details are not described herein again.

Alternatively, in another possible implementation, the UE determines, based on a battery and/or service state of the UE, that the UE needs to enter the power saving mode, and the UE may initiate an energy saving request to the network side device; and the network side device decides whether to respond to the UE based on the energy saving request. A possible implementation is the same as that in the channel access actively initiated by the network side device in 1. when the UE initiates an energy saving request to the network side device, and the network side device decides whether to respond to the UE based on the energy saving request. Details are not described herein again.

In the technical solution provided in this embodiment of this application, available spectrum resources and the flexibility of the system may be increased, so that the terminal may save power on the unlicensed band.

It should be noted that the indication method of a power saving mode provided in the embodiments of this application can be performed by an indication apparatus of a power saving mode or a control module included in the indication apparatus of a power saving mode and configured to perform the indication method of a power saving mode. In this embodiment of this application, the indication apparatus of a power saving mode provided in the embodiments of this application is described by using an example in which the indication method of a power saving mode is performed by an indication apparatus of a power saving mode.

Figure 3A:
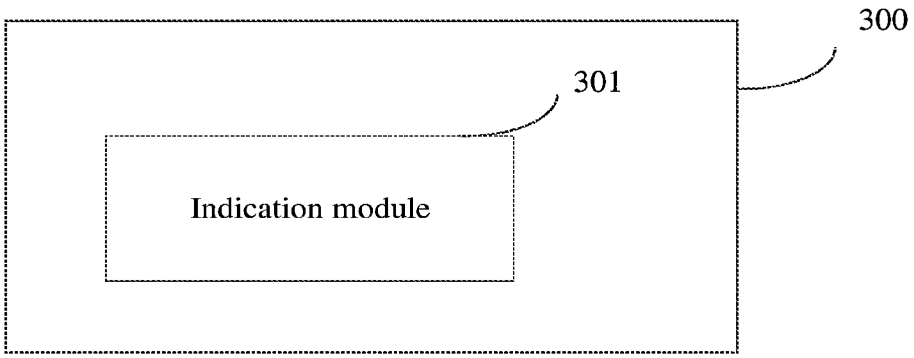
FIG. 3A is a schematic structural diagram of an indication apparatus of a power saving mode according to an embodiment of this application.

FIG. 3A is a schematic structural diagram of an indication apparatus of a power saving mode according to an embodiment of this application. As shown in FIG. 3A, the indication apparatus 300 of a power saving mode mainly includes an indication module 301.

In this embodiment of this application, the indication module 301 is configured to instruct, in a channel occupancy time (COT) of an unlicensed band, a terminal to enter a power saving mode.

Figure 3B:
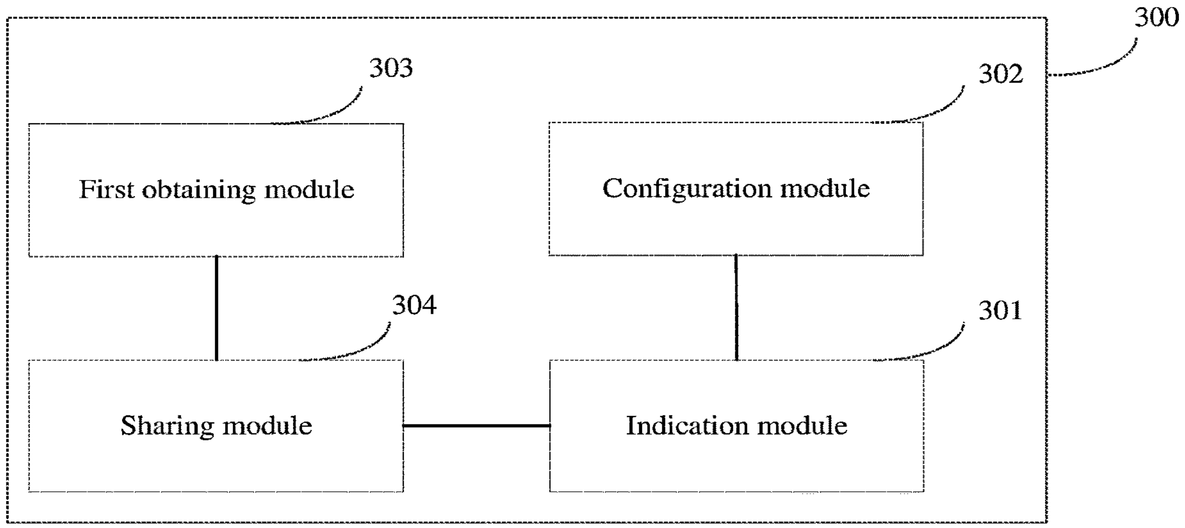
FIG. 3B is another schematic structural diagram of an indication apparatus of a power saving mode according to an embodiment of this application.

In a possible implementation, as shown in FIG. 3B, the indication apparatus 300 of a power saving mode may further include:

a configuration module 302, configured to configure a parameter related to the power saving mode of the terminal.

In a possible implementation, the parameter related to the power saving mode includes at least one of:

first indication information, where the first indication information indicates a first time-frequency range of monitoring a physical downlink control channel (PDCCH) by the terminal in the power saving mode;

second indication information, where the second indication information indicates whether the terminal performs channel state measurement in the power saving mode and/or a type of channel state measurement performed in the power saving mode; or third indication information, where the third indication information indicates whether the terminal performs uplink transmission in the power saving mode and/or a type of uplink transmission performed in the power saving mode.

In a possible implementation, the instructing, by the indication module 301 in a channel occupancy time (COT) of an unlicensed band, a terminal to enter a power saving mode includes: sending indication information to the terminal within the COT, and instructing the terminal to enter the power saving mode by using the indication information.

In a possible implementation, the indication information includes indication signaling or energy saving response information, where the energy saving response information is a response to an energy saving request initiated by the terminal.

In a possible implementation, as shown in FIG. 3B, the indication apparatus 300 of a power saving mode may further include:

a first obtaining module 303, configured to: before sending indication information to the terminal within the COT, initiate channel access of the unlicensed band, so as to obtain the COT of the unlicensed band; and a sharing module 304, configured to share the obtained COT with the terminal.

Figure 3C:
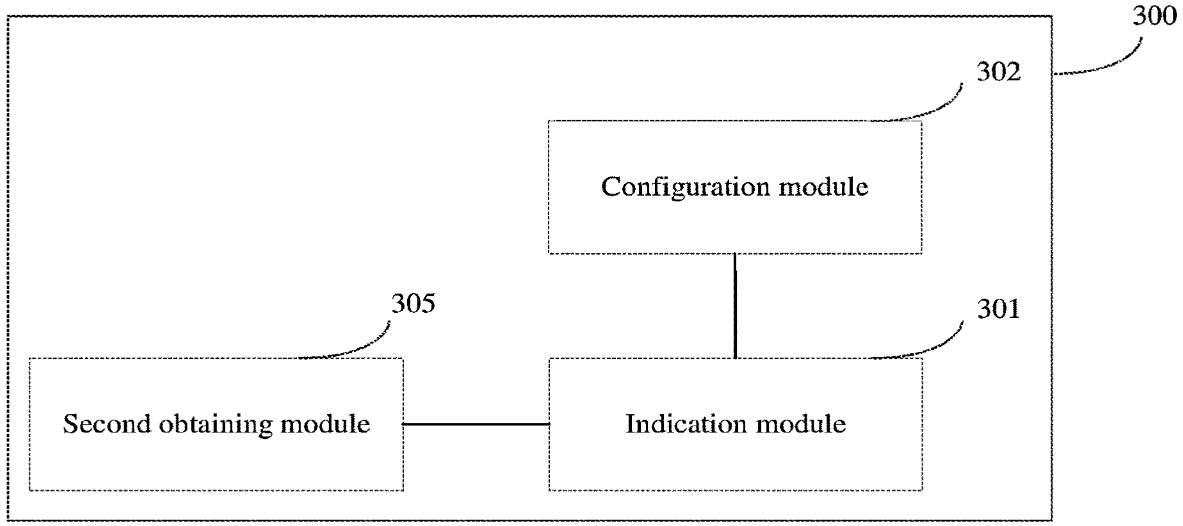
FIG. 3C is still another schematic structural diagram of an indication apparatus of a power saving mode according to an embodiment of this application.

In a possible implementation, as shown in FIG. 3C, the indication apparatus 300 of a power saving mode may further include:

a second obtaining module 305, configured to: before sending indication information to the terminal within the COT, obtain the COT shared by the terminal, where the COT is obtained after the terminal initiates channel access of an unlicensed band based on a channel access parameter.

In a possible implementation, the configuration module 302 is further configured to: before the obtaining the COT shared with the terminal, configure the channel access parameter for the terminal.

In a possible implementation, the channel access parameter includes at least one of:

clear channel assess (CCA) duration;

a contention window length; or a channel occupancy length.

In a possible implementation, the channel access parameter includes at least one of:

a start location of a fixed frame period (FFP);

an offset of an FFP;

a period length of an FFP;

CCA duration;

a channel occupancy length; or an idle period length.

In a possible implementation, that the indication module 301 sends indication information to the terminal within the COT includes:

sending the indication signaling to the terminal.

In a possible implementation, the indication signaling includes a downlink signal, where the downlink signal includes at least one of:

a downlink signal carried on a UE-specific PDCCH;

a downlink signal carried on a group common PDCCH;

a specific reference signal; or a specific reference sequence.

In a possible implementation, that the indication module 301 sends indication information to the terminal within the COT includes:

receiving the energy saving request initiated by the terminal within the COT; and sending the energy saving response information to the terminal within the COT.

In a possible implementation, the energy saving request includes at least one of:

uplink control signaling;

a specific scheduling request (SR);

an uplink signal carried on a physical uplink shared channel (PUSCH);

a media access control (MAC) control element (CE); or a specific uplink reference signal.

In a possible implementation, the energy saving request is used to indicate a power saving parameter.

The indication apparatus of a power saving mode in this embodiment of this application may be an apparatus, or may be a component, an integrated circuit, or a chip in a network side device. The apparatus may be the network side device. For example, the network side device may include but is not limited to the types of network side devices 12 listed above. This is not limited in this embodiment of this application.

The indication apparatus of a power saving mode in this embodiment of this application may be an apparatus with an operating system. The operating system may be an Android operating system, may be an iOS operating system, or may be another possible operating system, which is not limited in the embodiments of this application.

The indication apparatus of a power saving mode provided in this embodiment of this application can implement the processes implemented in the method embodiment of FIG. 2, and a same technical effect can be achieved. To avoid repetition, details are not described herein again.

Figure 4:
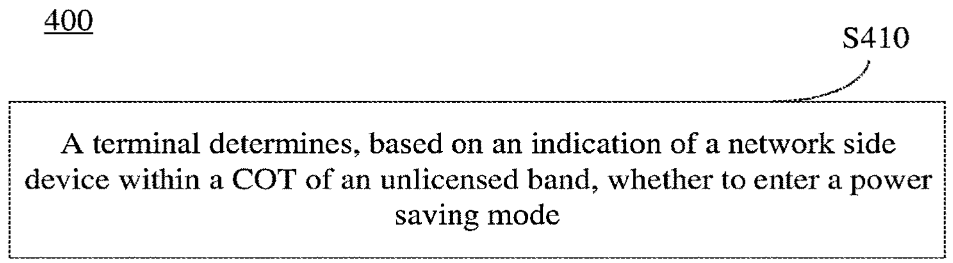
FIG. 4 is a schematic flowchart of a method for determining whether to enter a power saving mode according to an embodiment of this application.

FIG. 4 is a schematic flowchart of a method for determining whether to enter a power saving mode according to an embodiment of this application, and the method 400 may be performed by a terminal. In other words, the method may be performed by software or hardware installed in the terminal. As shown in FIG. 4, the method may include the following steps.

S410. A terminal determines, based on an indication of a network side device within a COT of an unlicensed band, whether to enter a power saving mode.

In this embodiment of this application, the method 400 is an execution method of the terminal corresponding to the method 200, and an execution process thereof is corresponding to the method 200.

In this embodiment of this application, the terminal determines, based on an indication of a network side device within a COT of an unlicensed band, whether to enter a power saving mode. Therefore, the terminal may enter the power saving mode in a case that the network side device indicates to enter the power saving mode, thus realizing energy saving on the unlicensed band.

In a possible implementation, after S410, if entering the power saving mode, the terminal performs a power saving operation based on a parameter related to the power saving mode configured by the network side device for the terminal.

The parameter related to the power saving mode configured by the network side device for the terminal may be configured by the network side device through higher layer signaling or specified by a protocol, or may be indicated by the network side device when instructing the terminal to enter the power saving mode. For example, if the network side device instructs the terminal to enter the power saving mode through the indication signaling, the indication signaling may also indicate the parameter related to the power saving mode.

In a possible implementation, the parameter related to the power saving mode includes at least one of:

(1) first indication information, where the first indication information indicates a first time-frequency range of monitoring a physical downlink control channel (PDCCH) by the terminal in the power saving mode;

(2) second indication information, where the second indication information indicates whether the terminal performs channel state measurement in the power saving mode and/or a type of channel state measurement performed in the power saving mode; or (3) third indication information, where the third indication information indicates whether the terminal performs uplink transmission in the power saving mode and/or a type of uplink transmission performed in the power saving mode.

It should be noted that the parameter related to the power saving mode in the method 400 is the same as that in the method 200, and reference may be made to the descriptions in the method 200. Details are not provided herein again.

In a possible implementation, the performing, by the terminal, a power saving operation includes at least one of:

(1) monitoring a specific PDCCH candidate set at the first time-frequency range;

(2) performing channel state measurement at the first time-frequency range based on a pre-agreement or based on an indication of the second indication information; or (3) performing uplink transmission at the first time-frequency range based on a pre-agreement or based on an indication of the third indication information.

In a possible implementation, the specific PDCCH candidate set includes one of:

(1) all PDCCH search space candidate sets;

(2) a user-specific search space set and/or a predetermined type of common search space set; or (3) a PDCCH candidate set specified by a network side.

It should be noted that when performing the power saving operation, the terminal may also determine not to monitor a specific PDCCH candidate set at the first time-frequency range based on the parameter related to the power saving mode.

In a possible implementation, after the terminal enters the power saving mode, and when the terminal performs the power saving operation, the performing channel state measurement includes at least one of:

(1) not performing any CSI measurement;

(2) performing periodic CSI measurement, and not performing or not supporting aperiodic and/or semi-persistent CSI measurement;

(3) performing restricted CSI measurement, for example, only measuring an interference confidence of a channel and/or a CQI of a broadband;

(4) performing all CSI measurements;

(5) not performing radio resource management (RRM) measurement;

(6) performing RRM measurement; or (7) performing relaxed RRM measurement.

In a possible implementation, after the terminal enters the power saving mode, and when the terminal performs the power saving operation, the performing uplink transmission includes at least one of:

(1) not performing any uplink transmission;

(2) performing SR transmission of a PUCCH;

(3) performing periodic channel state information (P-CSI) transmission;

(4) performing uplink configured grant data transmission;

(5) performing SP-CSI transmission; or (6) performing periodic or semi-persistent periodic SRS transmission.

In a possible implementation, the determining, by a terminal based on an indication of a network side device within a COT of an unlicensed band, whether to enter a power saving mode includes: receiving indication information sent by the network side device within the COT, and determining, based on an indication of the indication information, whether to enter the power saving mode.

Optionally, the indication information includes indication signaling or energy saving response information, where the energy saving response information is a response to an energy saving request initiated by the terminal.

Similar to the method 200, the method 400 also includes two implementations: the network side device actively initiates channel access; and the terminal actively initiates channel access. The two implementations are described below.

1. The network side device actively initiates channel access.

In a possible implementation, the network side device initiates channel access of the unlicensed band, so as to obtain the COT of the unlicensed band; and the network side device shares the obtained COT with the terminal. In this possible implementation, before the receiving indication information sent by the network side device, the method may further include: obtaining the COT shared by the network side device.

In a possible implementation, after sharing the COT with the terminal, the network side device may send indication signaling to the terminal within the COT to instruct the UE to enter the power saving mode. Therefore, in this possible implementation, the receiving indication information sent by the network side device within the COT may include: receiving the indication signaling sent by the network side device within the COT.

Optionally, the indication signaling includes a downlink signal, where the downlink signal includes at least one of:

a downlink signal carried on a UE-specific PDCCH;

a downlink signal carried on a group common PDCCH;

a specific reference signal; or a specific reference sequence.

The indication signaling is the same as that in the method 200. Reference may be made to the descriptions in the method 200.

In the foregoing possible implementation, if the indication signaling indicates the COT and/or the parameter related to the power saving mode, the terminal may perform the corresponding power saving operation based on an instruction of the indication signaling. For details, refer to the related descriptions in the method 200.

Alternatively, in another possible implementation, the UE determines, based on a battery and/or service state of the UE, that the UE needs to enter the power saving mode, and initiates an energy saving request to the network side device. Therefore, in this possible implementation, the receiving indication information sent by the network side device within the COT may include: determining, by the terminal based on a battery and/or service state of the terminal, that the terminal needs to enter the power saving mode, and initiating an energy saving request to the network side device; and receiving the energy saving response information returned by the network side device.

Optionally, the energy saving request includes at least one of:

uplink control signaling;

a specific SR;

an uplink signal carried on a PUSCH;

a MAC CE; or a specific uplink reference signal.

The energy saving request is the same as that in the method 200, and reference may be made to the descriptions in the method 200. Details are not provided herein again.

Optionally, the energy saving request is used to indicate a power saving parameter.

Optionally, the power saving parameter includes a second time-frequency range for entering the power saving mode.

In this possible implementation, if the terminal receives the energy saving response information of the network side device in response to the energy saving request, the terminal may perform the energy saving operation based on the energy saving parameter indicated by the energy saving request. For details, refer to the related descriptions in the method 200.

2. The terminal actively initiates channel access.

In a possible implementation, the terminal may initiate channel access (LBT) of the unlicensed band when data needs to be transmitted, and after the channel access is successful, the obtained COT is shared with the network side device for use. That is, in this possible implementation, before the receiving, by a terminal on an unlicensed band, indication information sent by a network side device, the method may further include: initiating, by the terminal, channel access of an unlicensed band based on a channel access parameter to obtain the COT; and sharing the COT with the network side device.

In the foregoing possible implementation, optionally, if the UE successfully accesses channels on a plurality of carriers or a plurality of LBT subbands simultaneously, the UE may send uplink control information to the network side device (for example, the gNB), to indicate a quantity of or the number of carriers that can be shared with the network side device or a quantity of or the number of LBT subbands that can be shared with the network side device. The network side device may obtain the carrier or the LBT subband used within the COT based on the uplink control information.

In a possible implementation, the channel access parameter may be configured by the network side device for the terminal. Therefore, in this possible implementation, before the initiating, by the terminal, channel access of an unlicensed band based on a channel access parameter, the method may further include: obtaining the channel access parameter configured by the network side device for the terminal.

The channel access parameter is the same as that in the method 200. For example, if the terminal performs channel access in the LBE manner, the channel access parameter includes at least one of:

(1) CCA duration;

(2) a contention window length; or (3) a channel occupancy length.

In another possible implementation, if the terminal performs channel access in the FBE manner, the channel access parameter includes at least one of:

(1) a start location of an FFP;

(2) an offset of an FFP;

(3) a period length of an FFP;

(4) CCA duration;

(5) a channel occupancy length; or (6) an idle period length.

After the terminal shares the COT with the network side device, similar to the network side device actively initiating channel access, the network side device may actively send the indication signaling to the terminal to instruct the terminal to enter the power saving mode. For details, refer to the foregoing description that the network side device sends the indication signaling to the terminal when the network side device actively initiates channel access. Details are not described herein again.

Alternatively, the terminal may also determine, based on a battery and/or service state of the terminal, that the terminal needs to enter the power saving mode, and initiate an energy saving request to the network side device. The network side device determines whether to respond to the UE based on the energy saving request. For example, the network side device may determine whether to support the energy saving mode and/or the energy saving degree requested by the terminal based on the parameter carried in the energy saving request. For an implementation process, refer to the foregoing description of the implementation that the terminal sends the energy saving request to the network side device when the network side device actively initiates channel access. Details are not described herein again.

It should be noted that the method for determining whether to enter a power saving mode provided in the embodiments of this application can be performed by an apparatus for determining whether to enter a power saving mode or a control module included in the apparatus for determining whether to enter a power saving mode and configured to perform the method for determining whether to enter a power saving mode. In this embodiment of this application, the apparatus for determining whether to enter a power saving mode provided in the embodiments of this application is described by using an example in which the method for determining whether to enter a power saving mode is performed by an apparatus for determining whether to enter a power saving mode.

Figure 5A:
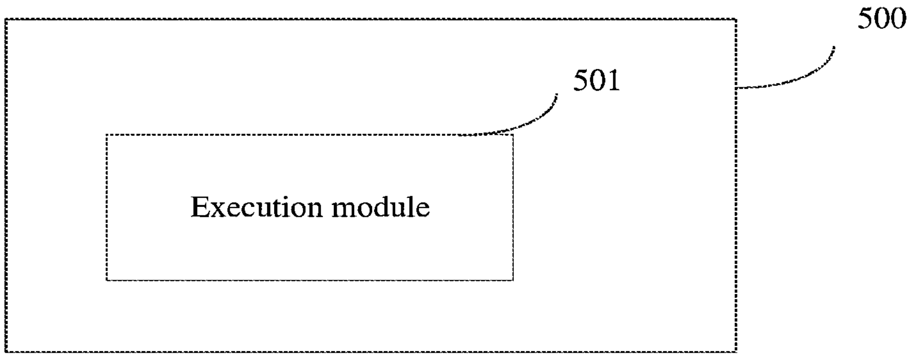
FIG. 5A is a schematic structural diagram of an apparatus for determining whether to enter a power saving mode according to an embodiment of this application.

FIG. 5A is a schematic structural diagram of an apparatus for determining whether to enter a power saving mode according to an embodiment of this application. As shown in FIG. 5A, the apparatus for determining whether to enter a power saving mode mainly includes an execution module 501.

In this embodiment of this application, the execution module 501 is configured to determine, based on an indication of a network side device within a COT of an unlicensed band, whether to enter a power saving mode.

In a possible implementation, the execution module 501 is further configured to: after entering the power saving mode, perform a power saving operation based on a parameter related to the power saving mode configured by the network side device for the terminal.

In a possible implementation, the parameter related to the power saving mode includes at least one of:

first indication information, where the first indication information indicates a first time-frequency range of monitoring a physical downlink control channel (PDCCH) by the terminal in the power saving mode;

second indication information, where the second indication information indicates whether the terminal performs channel state measurement in the power saving mode and/or a type of channel state measurement performed in the power saving mode; or third indication information, where the third indication information indicates whether the terminal performs uplink transmission in the power saving mode and/or a type of uplink transmission performed in the power saving mode.

In a possible implementation, that the execution module 501 performs a power saving operation includes at least one of:

monitoring a specific PDCCH candidate set at the first time-frequency range;

performing channel state measurement at the first time-frequency range based on a pre-agreement or based on an indication of the second indication information; or performing uplink transmission at the first time-frequency range based on a pre-agreement or based on an indication of the third indication information.

In a possible implementation, the performing channel state measurement includes at least one of:

not performing any channel state information (CSI) measurement;

performing periodic CSI measurement, and not performing or not supporting aperiodic and/or semi-persistent CSI measurement;

performing restricted CSI measurement;

performing all CSI measurements;

not performing RRM measurement;

performing RRM measurement; or performing relaxed RRM measurement.

In a possible implementation, the performing uplink transmission includes at least one of:

not performing any uplink transmission;

performing SR transmission of a physical uplink control channel (PUCCH);

performing P-CSI transmission;

performing uplink configured grant data transmission;

performing semi-persistent channel state information (SP-CSI) transmission; or performing periodic or semi-persistent periodic sounding reference signal (SRS) transmission.

In a possible implementation, that the execution module 501 determines, based on an indication of a network side device within a COT of an unlicensed band, whether to enter a power saving mode includes: receiving indication information sent by the network side device within the COT, and determining, based on an indication of the indication information, whether to enter the power saving mode.

In a possible implementation, the indication information includes indication signaling or energy saving response information, where the energy saving response information is a response to an energy saving request initiated by the terminal.

In a possible implementation, the execution module 501 is further configured to:

before the receiving indication information sent by the network side device, obtain the COT shared by the network side device.

In a possible implementation, the execution module 501 is further configured to:

before receiving, on an unlicensed band, indication information sent by a network side device, initiate channel access of an unlicensed band based on a channel access parameter to obtain the COT; and share the COT with the network side device.

Figure 5B:
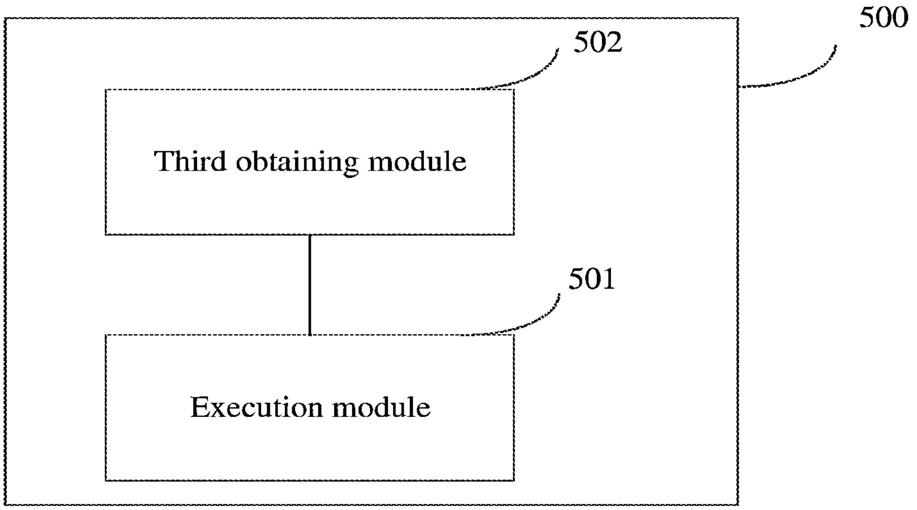
FIG. 5B is another schematic structural diagram of an apparatus for determining whether to enter a power saving mode according to an embodiment of this application.

In a possible implementation, as shown in FIG. 5B, the apparatus may further include a third obtaining module 502, configured to: before the initiating, by the terminal, channel access of an unlicensed band based on a channel access parameter, obtain the channel access parameter configured by the network side device for the terminal.

In a possible implementation, the channel access parameter includes at least one of:

CCA duration;

a contention window length; or a channel occupancy length.

In a possible implementation, the channel access parameter includes at least one of:

a start location of an FFP;

an offset of an FFP;

a period length of an FFP;

CCA duration;

a channel occupancy length; or an idle period length.

In a possible implementation, that the execution module 501 receives indication information sent by the network side device within the COT includes:

receiving the indication signaling sent by the network side device within the COT.

In a possible implementation, the indication signaling includes a downlink signal, where the downlink signal includes at least one of:

a downlink signal carried on a UE-specific PDCCH;

a downlink signal carried on a group common PDCCH;

a specific reference signal; or a specific reference sequence.

In a possible implementation, that the execution module 501 receives indication information sent by the network side device within the COT includes:

determining, based on a battery and/or service state, that the terminal needs to enter the power saving mode, and initiating an energy saving request to the network side device; and receiving the energy saving response information returned by the network side device.

In a possible implementation, the energy saving request includes at least one of:

uplink control signaling;

a specific SR;

an uplink signal carried on a PUSCH;

a MAC CE; or a specific uplink reference signal.

In a possible implementation, the energy saving request is used to indicate a power saving parameter.

In a possible implementation, the power saving parameter includes a second time-frequency range for entering the power saving mode.

The apparatus for determining whether to enter a power saving mode in this embodiment of this application may be an apparatus, or a component, an integrated circuit, or a chip in a terminal. The apparatus may be a mobile terminal, or a non-mobile terminal. For example, the mobile terminal may include, but is not limited to, a type of the terminal 11 listed above. The non-mobile terminal may be a server, a network attached storage (NAS), a personal computer (PC), a television (TV), a teller machine, or a self-service machine. This is not limited in this embodiment of this application.

The apparatus for determining whether to enter a power saving mode in this embodiment of this application may be an apparatus with an operating system. The operating system may be an Android operating system, may be an iOS operating system, or may be another possible operating system, which is not limited in the embodiments of this application.

The apparatus for determining whether to enter a power saving mode provided in this embodiment of this application can implement the processes implemented in the method embodiment of FIG. 4, and a same technical effect can be achieved. To avoid repetition, details are not described herein again.

Figure 6:
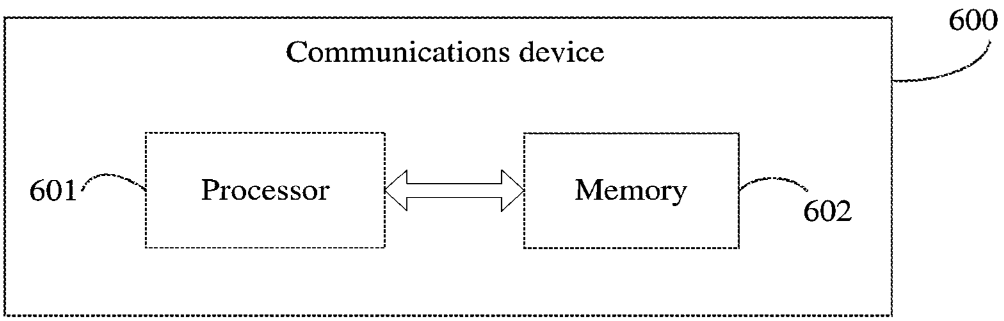
FIG. 6 is a schematic structural diagram of a communications device according to an embodiment of this application.

Optionally, as shown in FIG. 6, an embodiment of this application further provides a communications device 600, including a processor 601, a memory 602, a program or an instruction stored in the memory 602 and executable on the processor 601. For example, when the communications device 600 is a terminal, the program or the instruction is executed by the processor 601 to implement the processes in the embodiment of the foregoing method for determining whether to enter a power saving mode, and a same technical effect can be achieved. When the communications device 600 is a network side device, the program or the instruction is executed by the processor 601 to implement the processes in the embodiment of the foregoing indication method of a power saving mode, and a same technical effect can be achieved. To avoid repetition, details are not described herein again.

Figure 7:
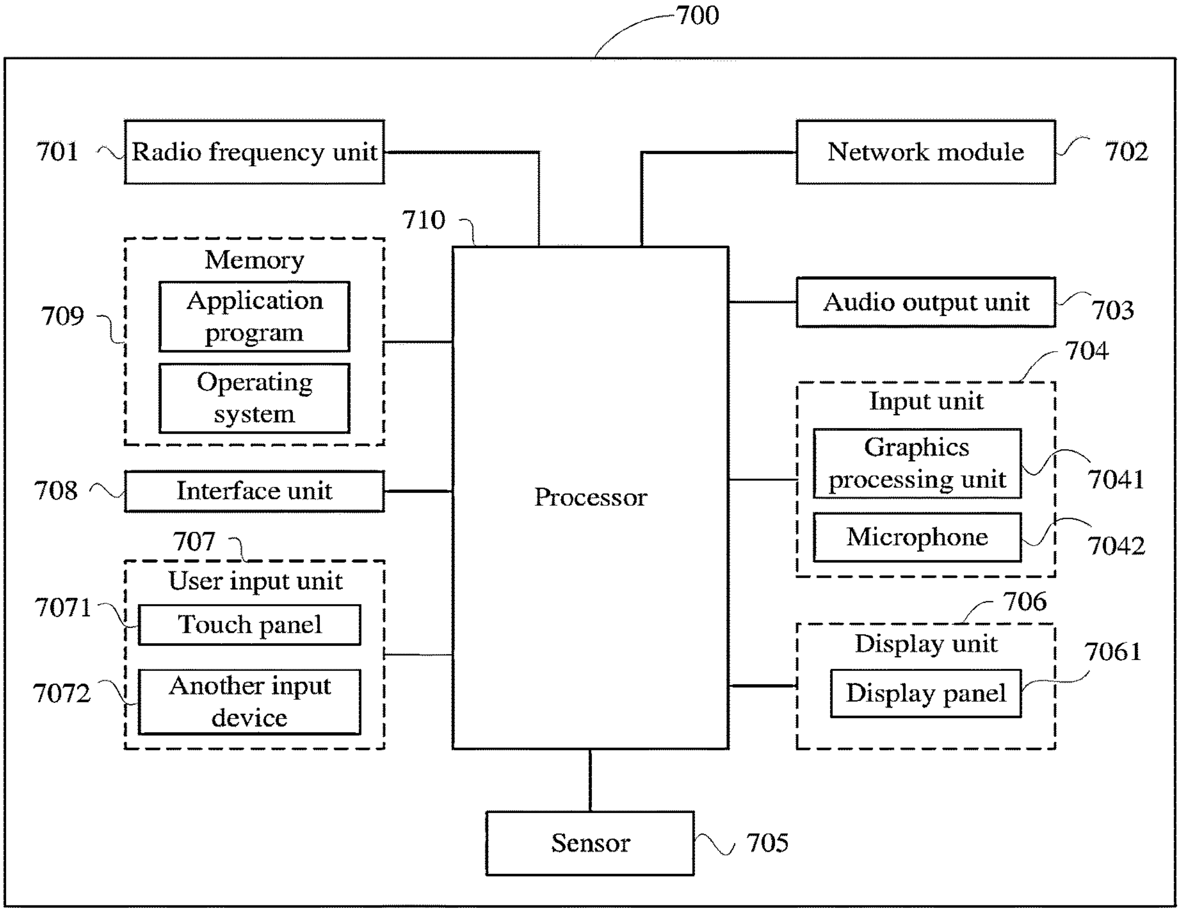
FIG. 7 is a schematic diagram of a hardware structure of a terminal according to an embodiment of this application.

FIG. 7 is a schematic diagram of a hardware structure of a terminal according to an embodiment of this application.

The terminal 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

It may be understood by a person skilled in the art that the terminal 700 may further include a power supply (such as a battery) that supplies power to each component. The power supply may be logically connected to the processor 710 by using a power management system, to implement functions such as charging, discharging, and power consumption management by using the power management system. The terminal structure shown in FIG. 7 constitutes no limitation on the terminal, and the terminal may include more or fewer components than those shown in the figure, or combine some components, or have different component arrangements. Details are not described herein.

It should be understood that, in the embodiments of this application, the input unit 704 may include a graphics processing unit (GPU) 7041 and a microphone 7042, and the graphics processing unit 7041 processes image data of a still picture or video obtained by an image capture apparatus (such as a camera) in a video capture mode or an image capture mode. The display unit 706 may include a display panel 7061, and the display panel 7061 may be configured in a form of a liquid crystal display, an organic light-emitting diode, or the like. The user input unit 707 includes a touch panel 7071 and another input device 7072. The touch panel 7071 is also referred to as a touchscreen. The touch panel 7071 may include two parts: a touch detection apparatus and a touch controller. The another input device 7072 may include but is not limited to a physical keyboard, a functional button (such as a volume control button or a power on/off button), a trackball, a mouse, and a joystick. Details are not described herein.

In this embodiment of this application, the radio frequency unit 701 receives downlink data from a network side device and then sends the downlink data to the processor 710 for processing; and sends uplink data to the network side device. Usually, the radio frequency unit 701 includes but is not limited to an antenna, at least one amplifier, a transceiver, a coupler, a low noise amplifier, a duplexer, and the like.

The memory 709 may be configured to store a software program or an instruction and various data. The memory 709 may mainly include a program or instruction storage area and a data storage area. The program or instruction storage area may store an operating system, and an application program or an instruction required by at least one function (for example, a sound playing function or an image playing function). In addition, the memory 709 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage component, a flash memory component, or another non-volatile solid-state storage component.

The processor 710 may include one or more processing units. Optionally, an application processor and a modem processor may be integrated into the processor 710. The application processor mainly processes an operating system, a user interface, an application program, an instruction, or the like. The modem processor mainly processes wireless communications, for example, a baseband processor. It can be understood that, alternatively, the modem processor may not be integrated into the processor 710.

The processor 710 is configured to determine, based on an indication of a network side device within a COT of an unlicensed band, whether to enter a power saving mode.

Optionally, the processor 710 is further configured to: after entering the power saving mode, perform a power saving operation based on a parameter related to the power saving mode configured by the network side device for the terminal.

Optionally, the parameter related to the power saving mode includes at least one of:

first indication information, where the first indication information indicates a first time-frequency range of monitoring a physical downlink control channel (PDCCH) by the terminal in the power saving mode;

second indication information, where the second indication information indicates whether the terminal performs channel state measurement in the power saving mode and/or a type of channel state measurement performed in the power saving mode; or third indication information, where the third indication information indicates whether the terminal performs uplink transmission in the power saving mode and/or a type of uplink transmission performed in the power saving mode.

Optionally, that the processor 710 performs a power saving operation includes at least one of:

monitoring a specific PDCCH candidate set at the first time-frequency range;

performing channel state measurement at the first time-frequency range based on a pre-agreement or based on an indication of the second indication information; or performing uplink transmission at the first time-frequency range based on a pre-agreement or based on an indication of the third indication information.

Optionally, the specific PDCCH candidate set includes one of:

all PDCCH search space candidate sets;

a user-specific search space set and/or a predetermined type of common search space set; or a PDCCH candidate set specified by a network side.

Optionally, that the processor 710 performs channel state measurement includes at least one of:

not performing any channel state information (CSI) measurement;

performing periodic CSI measurement, and not performing or not supporting aperiodic and/or semi-persistent CSI measurement;

performing restricted CSI measurement;

performing all CSI measurements;

not performing radio resource management (RRM) measurement;

performing RRM measurement; or performing relaxed RRM measurement.

Optionally, that the processor 710 performs uplink transmission includes at least one of:

not performing any uplink transmission;

performing SR transmission of a physical uplink control channel (PUCCH);

performing periodic channel state information (P-CSI) transmission;

performing uplink configured grant data transmission;

performing semi-persistent channel state information (SP-CSI) transmission; or performing periodic or semi-persistent periodic sounding reference signal (SRS) transmission.

Optionally, that the processor 710 determines, based on an indication of a network side device within a COT of an unlicensed band, whether to enter a power saving mode includes: receiving indication information sent by the network side device within the COT, and determining, based on an indication of the indication information, whether to enter the power saving mode.

Optionally, the indication information includes indication signaling or energy saving response information, where the energy saving response information is a response to an energy saving request initiated by the terminal.

Optionally, the processor 710 is further configured to: before the receiving indication information sent by the network side device, obtain the COT shared by the network side device.

Optionally, the processor 710 is further configured to: before receiving, on an unlicensed band, indication information sent by a network side device, initiate channel access of an unlicensed band based on a channel access parameter to obtain the COT; and share the COT with the network side device.

Optionally, the processor 710 is further configured to: before initiating channel access of an unlicensed band based on a channel access parameter, obtain the channel access parameter configured by the network side device for the terminal.

Optionally, the channel access parameter includes at least one of:

CCA duration;

a contention window length; or a channel occupancy length.

Optionally, the channel access parameter includes at least one of:

a start location of an FFP;

an offset of an FFP;

a period length of an FFP;

CCA duration;

a channel occupancy length; or an idle period length.

Optionally, the indication signaling includes a downlink signal, where the downlink signal includes at least one of:

a downlink signal carried on a UE-specific PDCCH;

a downlink signal carried on a group common PDCCH;

a specific reference signal; or a specific reference sequence.

Optionally, that the processor 710 receives indication information sent by the network side device within the COT includes: determining, by the terminal based on a battery and/or service state of the terminal, that the terminal needs to enter the power saving mode, and initiating an energy saving request to the network side device; and receiving the energy saving response information returned by the network side device.

Optionally, the energy saving request includes at least one of:

uplink control signaling;

a specific SR;

an uplink signal carried on a physical uplink shared channel (PUSCH);

a media access control (MAC) control element (CE); or a specific uplink reference signal.

Optionally, the energy saving request is used to indicate a power saving parameter.

Optionally, the power saving parameter includes a second time-frequency range for entering the power saving mode.

Figure 8:
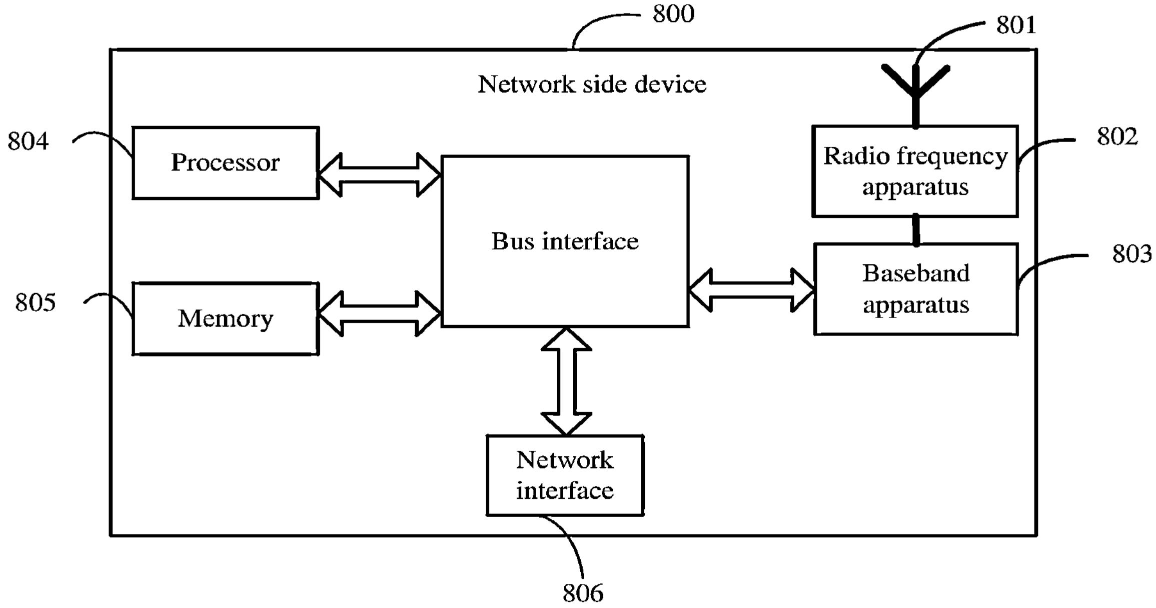
FIG. 8 is a schematic diagram of a hardware structure of a network side device according to an embodiment of this application.

For example, an embodiment of this application further provides a network side device. As shown in FIG. 8, a network device 800 includes an antenna 801, a radio frequency apparatus 802, and a baseband apparatus 803. The antenna 801 is connected to the radio frequency apparatus 802. In an uplink direction, the radio frequency apparatus 802 receives information by using the antenna 801, and transmits the received information to the baseband apparatus 803 for processing. In a downlink direction, the baseband apparatus 803 processes information that needs to be sent, and sends processed information to the radio frequency apparatus 802. The radio frequency apparatus 802 processes the received information, and sends processed information by using the antenna 801.

The frequency band processing apparatus may be located in the baseband apparatus 803. The method performed by the network side device in the above embodiment may be implemented in the baseband apparatus 803. The baseband apparatus 803 includes a processor 804 and a memory 805.

The baseband apparatus 803 may include, for example, at least one baseband board, where a plurality of chips are disposed on the baseband board. As shown in FIG. 8, one chip is, for example, the processor 804, which is connected to the memory 805, so as to invoke a program in the memory 805 to perform operations of the network device shown in the foregoing method embodiment.

The baseband apparatus 803 may further include a network interface 806, configured to exchange information with the radio frequency apparatus 802, where the interface is, for example, a common public radio interface (CPRI).

For example, the network side device in this embodiment of the present application further includes an instruction or a program stored in the memory 805 and executable on the processor 804. The processor 804 invokes the instruction or the program in the memory 805 to perform the method performed by the modules shown in FIG. 3A to FIG. 3C, and a same technical effect can be achieved. To avoid repetition, details are not described herein again.

An embodiment of this application further provides a non-transitory computer-readable storage medium, and the non-transitory computer-readable storage medium stores a program or an instruction. When the program or the instruction is executed by a processor, the processes in the embodiment of the foregoing method for determining whether to enter a power saving mode are implemented, or when the program or the instruction is executed by a processor, the processes in the embodiment of the foregoing indication method of a power saving mode are implemented, and a same technical effect can be achieved. To avoid repetition, details are not described herein again.

The processor is a processor in the terminal in the above embodiment. The non-transitory computer-readable storage medium includes a read-only memory (ROM), a random access memory (RAM), a magnetic disk, an optical disc, or the like.

An embodiment of this application further provides a chip. The chip includes a processor and a communications interface. The communications interface is coupled to the processor. The processor is configured to execute a program or an instruction of a network side device, to implement the processes in the embodiment of the foregoing indication method of a power saving mode, and a same technical effect can be achieved. Alternatively, the processor is configured to execute a program or an instruction of a terminal, to implement the processes in the embodiment of the foregoing method for determining whether to enter a power saving mode, and a same technical effect can be achieved. To avoid repetition, details are not described herein again.

It should be understood that the chip mentioned in this embodiment of this application may also be referred to as a system-level chip, a system chip, a chip system, or an on-chip system chip.

An embodiment of this application further provides a computer program product, and the computer program product includes a processor, a memory, and a program or an instruction stored in the memory and executable on the processor, where when the program or the instruction is executed by the processor, the processes in the embodiment of the indication method of a power saving mode are implemented, or the processes in the embodiment of the method for determining whether to enter a power saving mode are implemented, and a same technical effect can be achieved. To avoid repetition, details are not described herein again.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not preclude the presence of other identical elements in the process, method, article, or apparatus that includes the element. In addition, it should be noted that the scope of the methods and apparatuses in the embodiments of this application is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

Based on the descriptions of the foregoing implementation manners, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

The embodiments of this application are described above with reference to the accompanying drawings, but this application is not limited to the foregoing implementation manners. The foregoing implementation manners are merely schematic instead of restrictive. Under enlightenment of this application, a person of ordinary skills in the art may make many forms without departing from aims and the protection scope of claims of this application, all of which fall within the protection scope of this application.

What is claimed is:

1. An indication method of a power saving mode, comprising:

instructing, by a network side device in a channel occupancy time (COT) of an unlicensed band, a terminal to enter a power saving mode;

wherein before the instructing, by the network side device in the COT of the unlicensed band, the terminal to enter the power saving mode, the method further comprises configuring a parameter related to the power saving mode of the terminal;

wherein the parameter related to the power saving mode comprises at least one of:

second indication information indicating at least one of: whether the terminal performs channel state measurement in the power saving mode, or a type of channel state measurement performed in the power saving mode; or third indication information indicating at least one of: whether the terminal performs uplink transmission in the power saving mode, or a type of uplink transmission performed in the power saving mode;

wherein the instructing, by the network side device in the COT of the unlicensed band, the terminal to enter the power saving mode comprises: sending, by the network side device, indication information to the terminal within the COT, and instructing the terminal to enter the power saving mode by using the indication information; and wherein before the sending, by the network side device, the indication information to the terminal within the COT, the method further comprises obtaining the COT shared by the terminal, wherein the COT is obtained after the terminal initiates channel access of the unlicensed band based on a channel access parameter.

2. The method according to claim 1, wherein the indication information comprises indication signaling or energy saving response information, wherein the energy saving response information is a response to an energy saving request initiated by the terminal.

3. The method according to claim 2, wherein the indication signaling comprises a downlink signal, wherein the downlink signal comprises at least one of:

a downlink signal carried on a user equipment (UE)-specific physical downlink control channel (PDCCH);

a downlink signal carried on a group common PDCCH;

a specific reference signal; or a specific reference sequence.

4. The method according to claim 2, wherein the sending, by the network side device, the indication information to the terminal within the COT comprises:

receiving the energy saving request initiated by the terminal within the COT; and sending the energy saving response information to the terminal within the COT.

5. The method according to claim 4, wherein the energy saving request comprises at least one of:

uplink control signaling;

a specific scheduling request (SR);

an uplink signal carried on a physical uplink shared channel (PUSCH);

a media access control (MAC) control element (CE); or a specific uplink reference signal.

6. The method according to claim 1, wherein before the obtaining the COT shared with the terminal, the method further comprises:

configuring the channel access parameter for the terminal.

7. The method according to claim 6, wherein the channel access parameter comprises at least one of:

clear channel assess (CCA) duration;

a contention window length; or a channel occupancy length;

or the channel access parameter comprises at least one of:

a start location of a fixed frame period (FFP);

an offset of an FFP;

a period length of an FFP;

CCA duration;

a channel occupancy length; or an idle period length.

8. A method for determining whether to enter a power saving mode, comprising:

determining, by a terminal based on an indication of a network side device within a channel occupancy time (COT) of an unlicensed band, whether to enter a power saving mode; and after entering the power saving mode, performing, by the terminal, a power saving operation based on a parameter related to the power saving mode configured by the network side device for the terminal;

wherein the parameter related to the power saving mode comprises at least one of:

second indication information indicating at least one of: whether the terminal performs channel state measurement in the power saving mode, or a type of channel state measurement performed in the power saving mode; or third indication information indicating at least one of: whether the terminal performs uplink transmission in the power saving mode, or a type of uplink transmission performed in the power saving mode;

wherein the determining, by the terminal based on the indication of the network side device within the COT of the unlicensed band, whether to enter the power saving mode comprises: receiving indication information sent by the network side device within the COT, and determining, based on an indication of the indication information, whether to enter the power saving mode;

wherein before the receiving the indication information sent by the network side device, the method further comprises:

initiating, by the terminal, channel access of the unlicensed band based on a channel access parameter to obtain the COT; and sharing the COT with the network side device.

9. The method according to claim 8, wherein the performing, by the terminal, the power saving operation comprises at least one of:

monitoring a specific physical downlink control channel (PDCCH) candidate set at a first time-frequency range;

performing channel state measurement at the first time-frequency range based on a pre-agreement or based on an indication of the second indication information; or performing uplink transmission at the first time-frequency range based on a pre-agreement or based on an indication of the third indication information.

10. The method according to claim 9, wherein the specific PDCCH candidate set comprises one of:

all PDCCH search space candidate sets;

a user-specific search space set and/or a predetermined type of common search space set; or a PDCCH candidate set specified by a network side.

11. The method according to claim 9, wherein the performing channel state measurement comprises at least one of:

not performing any channel state information (CSI) measurement;

performing periodic CSI measurement, and not performing or not supporting aperiodic and/or semi-persistent CSI measurement;

performing restricted CSI measurement;

performing all CSI measurements;

not performing radio resource management (RRM) measurement;

performing RRM measurement; or performing relaxed RRM measurement.

12. The method according to claim 9, wherein the performing uplink transmission comprises at least one of:

not performing any uplink transmission;

performing scheduling request (SR) transmission of a physical uplink control channel (PUCCH);

performing periodic channel state information (P-CSI) transmission;

performing uplink configured grant data transmission;

performing semi-persistent channel state information (SP-CSI) transmission; or performing periodic or semi-persistent periodic sounding reference signal (SRS) transmission.

13. A terminal, comprising:

a processor, a memory, and a program or an instruction stored in the memory and executable on the processor, wherein the program or the instruction, when executed by the processor, causes the terminal to perform:

determining, based on an indication of a network side device within a channel occupancy time (COT) of an unlicensed band, whether to enter a power saving mode; and after entering the power saving mode, performing a power saving operation based on a parameter related to the power saving mode configured by the network side device for the terminal;

wherein the parameter related to the power saving mode comprises at least one of:

second indication information indicating at least one of: whether the terminal performs channel state measurement in the power saving mode, or a type of channel state measurement performed in the power saving mode; or third indication information indicating at least one of: whether the terminal performs uplink transmission in the power saving mode, or a type of uplink transmission performed in the power saving mode;

wherein the program or the instruction, when executed by the processor, causes the terminal to perform: receiving indication information sent by the network side device within the COT, and determining, based on an indication of the indication information, whether to enter the power saving mode;

wherein the program or the instruction, when executed by the processor, causes the terminal further to perform: initiating channel access of the unlicensed band based on a channel access parameter to obtain the COT, and sharing the COT with the network side device.

14. A network side device, comprising:

a processor, a memory, and a program or an instruction stored in the memory and executable on the processor, wherein the program or the instruction, when executed by the processor, causes the network side device to perform:

configuring a parameter related to a power saving mode of a terminal;

obtaining a channel occupancy time (COT) shared by the terminal, wherein the COT is obtained after the terminal initiates channel access of an unlicensed band based on a channel access parameter; and sending indication information to the terminal within the COT, and instructing the terminal to enter the power saving mode by using the indication information;

wherein the parameter related to the power saving mode comprises at least one of:

second indication information indicating at least one of: whether the terminal performs channel state measurement in the power saving mode, or a type of channel state measurement performed in the power saving mode; or third indication information indicating at least one of: whether the terminal performs uplink transmission in the power saving mode, or a type of uplink transmission performed in the power saving mode.

15. The network side device according to claim 14, wherein the indication information comprises indication signaling or energy saving response information, wherein the energy saving response information is a response to an energy saving request initiated by the terminal.

16. The network side device according to claim 15, wherein the indication signaling comprises a downlink signal, wherein the downlink signal comprises at least one of:

a downlink signal carried on a user equipment (UE)-specific physical downlink control channel (PDCCH);

a downlink signal carried on a group common PDCCH;

a specific reference signal; or a specific reference sequence.

17. The network side device according to claim 15, wherein the program or the instruction, when executed by the processor, causes the network side device to perform:

receiving the energy saving request initiated by the terminal within the COT; and sending the energy saving response information to the terminal within the COT.

18. The network side device according to claim 17, wherein the energy saving request comprises at least one of:

uplink control signaling;

a specific scheduling request (SR);

an uplink signal carried on a physical uplink shared channel (PUSCH);

a media access control (MAC) control element (CE); or a specific uplink reference signal.

19. The network side device according to claim 14, wherein the program or the instruction, when executed by the processor, causes the network side device to further perform:

configuring the channel access parameter for the terminal.

20. The network side device according to claim 19, wherein:

the channel access parameter comprises at least one of:

clear channel assess (CCA) duration;

a contention window length; or a channel occupancy length;

or the channel access parameter comprises at least one of:

a start location of a fixed frame period (FFP);

an offset of an FFP;

a period length of an FFP;

CCA duration;

a channel occupancy length; or an idle period length.

* * * * *